United States Patent [19]

Chelin et al.

[11] 4,060,151
[45] Nov. 29, 1977

[54] ADJUSTABLE ARBOR WHEEL MOUNTING ARRANGEMENT

[75] Inventors: Charles R. Chelin; Alan J. Hickman, both of Peoria, Ill.

[73] Assignee: Towmotor Corporation, Mentor, Ohio

[21] Appl. No.: 752,707

[22] Filed: Dec. 20, 1976

[51] Int. Cl.² ............................................. B66B 7/02
[52] U.S. Cl. .................................. 187/95; 187/9 E; 308/6 R
[58] Field of Search ............... 187/9 E, 9 R, 95; 308/3 R, 6 R, 62, 219, 227; 212/55; 198/836; 52/118, 121; 301/5.3, 5.7

[56] References Cited

U.S. PATENT DOCUMENTS

| | | | |
|---|---|---|---|
| 2,881,031 | 4/1959 | Comfort | 308/6 R |
| 3,605,950 | 9/1971 | Goodacre | 187/9 E |
| 4,019,786 | 4/1977 | Yarris | 187/9 E X |

FOREIGN PATENT DOCUMENTS

| | | | |
|---|---|---|---|
| 436,796 | 12/1974 | U.S.S.R. | 187/95 |

*Primary Examiner*—Evon C. Blunk
*Assistant Examiner*—James L. Rowland
*Attorney, Agent, or Firm*—Charles E. Lanchantin, Jr.

[57] ABSTRACT

An adjustable arbor wheel mounting arrangement has a support frame having a mounting surface and an arbor having an axis and an end mounting surface. A wheel means is mounted on the arbor and fastening means is provided for clamping the arbor end mounting surface against the mounting surface of the support frame upon reaching a preselected working position. An abutment reaction means is provided for directing thrust forces upon the wheel means and substantially normal to the axis through the arbor and to the support frame.

5 Claims, 3 Drawing Figures

ADJUSTABLE ARBOR WHEEL MOUNTING ARRANGEMENT

BACKGROUND OF THE INVENTION

The present invention is related to an adjustable arbor wheel mounting arrangement and more particularly to a device for more directly transmitting certain thrust forces on the wheel to the support frame. Such wheel mounting arrangement is preferably employed within a lift truck mast unit for maintaining transverse alignment of its movable upright within a supporting upright.

Conventional lift truck mast units include a stationary upright with one or more inner uprights nested for vertical rolling movement within it in order to allow a pair of lift fork members associated therewith to lift, carry and deposit a load as is desired. While a plurality of wheels or rollers are mounted for rolling engagement longitudinally within the beams or channels of these uprights, they usually are not adapted to fully transmit the side thrust forces. Consequently, in order to limit transverse movement of the inner upright relative to the supporting upright, side thrust rollers are commonly employed therebetween.

Prior side thrust roller mounting arrangements have for the most part utilized an arbor with a relatively fixed disposition on the lift mast unit. However, the variable dimensions of the uprights of these units require a custom fitting operation to insure that the side thrust rollers closely engage the opposite sides of the uprights. These arbors have heretofore been clampingly secured to the upright frame by one or more fasteners or bolts arranged in parallel with the axis of the arbor. Unfortunately, such construction is not well adapted to resist high side thrust forces normal thereto so that a large number of highly tightened fasteners are required. More recently, some arbors have been made with eccentric shafts so that they may be preadjusted to assure proper lateral contact of the roller with the upright. However, such eccentric arbor arrangements are complex and costly, suffer the disadvantage that the shaft is subject to shear loading, and require high torque on the fasteners thereof to obtain a sufficiently positive clamping force.

The present invention is directed to overcoming one or more of the problems as set forth above.

Accordingly, the present invention provides a novel adjustable arbor wheel arrangement including a support frame having a mounting surface, an arbor having an axis and an end mounting surface, a wheel rotatably mounted on the arbor, a plurality of fasteners for clamping the arbor end mounting surface against the mounting surface of the frame, and an abutment reaction device for directing thrust forces upon the wheel and substantially normal to the axis from the arbor to the frame. Such a wheel mounting arrangement is particularly advantageous in maintaining the lateral alignment between the uprights of a lift truck mast unit.

DETAILED DESCRIPTION OF THE INVENTION

Figure 1:
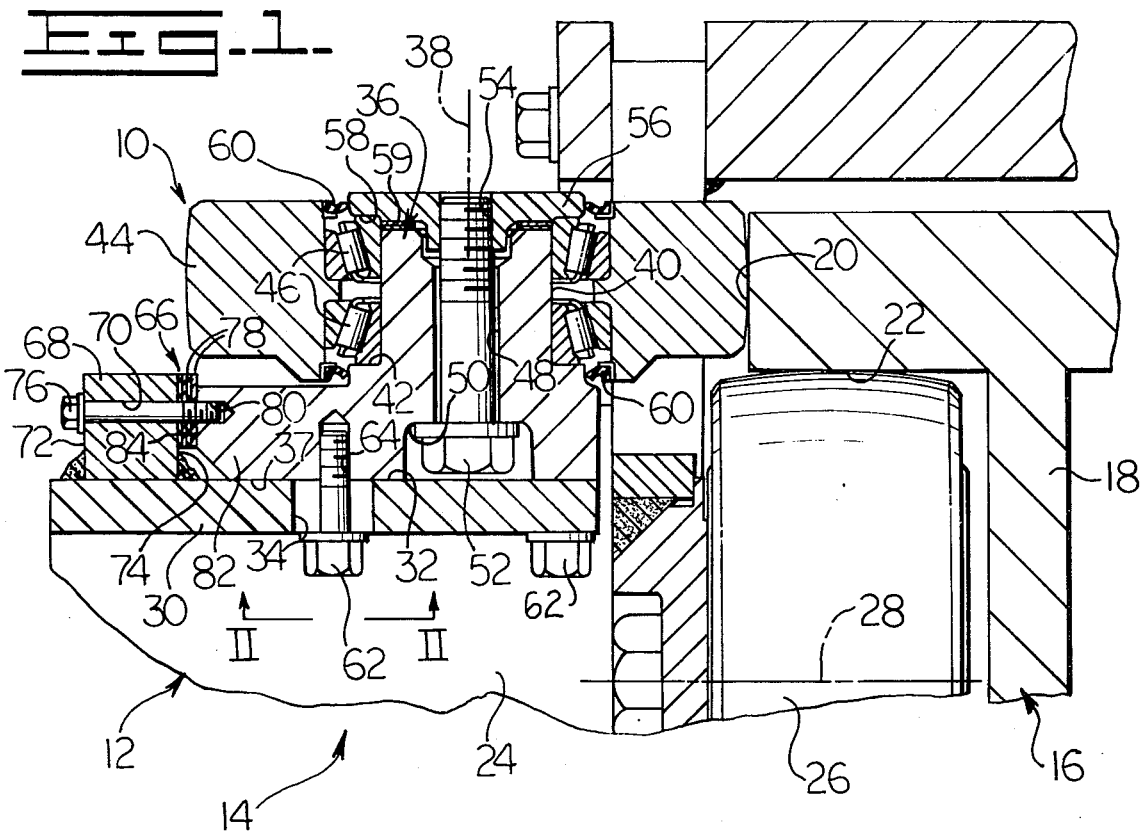
FIG. 1 is a fragmentary horizontal sectional view of a lift truck mast unit incorporating the adjustable arbor wheel mounting arrangement of the present invention.

One of a cooperating pair of adjustable arbor wheel mounting arrangements 10 is shown in FIG. 1 as being mounted on a stationary supporting upright 12 of a lift truck mast unit 14 in order to maintain the transverse alignment of an inner upright 16 movably nested within it. The inner upright includes a substantially vertical pair of transversely spaced apart and connected channular beams 18 having a laterally outwardly facing rail surface 20 and a forwardly facing rail surface 22. Although only one wheel mounting arrangement and one channular beam is shown for illustrative convenience, it is to be appreciated that another set thereof is located at the right side when viewing the drawing at the same elevation on the lift mast unit in a symmetrically opposite mirror image manner. Hereinafter, attention will be directed to a description of only one side of the lift mast unit.

As is clearly shown, the supporting upright 12 includes a frame 24 on which is mounted a longitudinally oriented guide roller 26. Such guide roller is so constructed and arranged that it revolves around a transverse axis 28 to make in-use rolling engagement with the rail surface 22 of the inner upright 16. In this way longitudinal forces are transmitted between the uprights.

Figure 2:
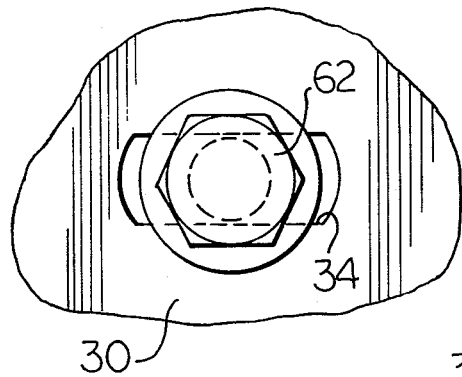
FIG. 2 is a fragmentary front elevational view of a portion of the adjustable arbor wheel mounting arrangement of FIG. 1 as taken along the line II—II thereof.

Referring now to the support frame 24 of the inner upright 16, it includes a mounting plate 30 which provides a transverse vertical mounting surface 32 and through which are defined a plurality of laterally or horizontally elongated slots or oversized passages 34 as is also shown in FIG. 2.

Upon further inspection of FIG. 1, it will be seen that the wheel mounting arrangement 10 includes an arbor generally indentified by the reference numeral 36, which has an end mounting surface 37 thereon and a longitudinal central axis 38 normal thereto. A cylindrical bearing mounting surface 40 with a shoulder 42 disposed axially inwardly or forwardly thereof is defined on the arbor, and a side thrust roller or wheel 44 is rotatably mounted thereon by way of a pair of opposed tapered roller bearings 46. Furthermore, the arbor has a central bore 48 therethrough and a counterbore 50 opening forwardly thereon, so that a threaded bolt 52 may be received therein. Specifically, the head of the bolt is seated within the counterbore so that it may be screw threadably engaged in a threaded bore 54 of an end cap 56 in order to firmly entrap the roller bearings between a shoulder 58 on the end cap and the shoulder 42 on the arbor. A shim pack 59 may be used between the end cap and the arbor to allow the bolt 52 to be highly tightened without attendant preloading of the roller bearings. Suitable seal rings 60 may also be utilized to retain lubricant in the bearings and to exclude dirt therefrom.

In order to secure the arbor 36 to the mounting plate 30, a plurality of fasteners or threaded bolts 62 are utilized which extend through the elongated slots 34 and are engaged in a corresponding plurality of threaded bores 64 in the arbor. These fasteners are oriented in a direction parallel with the arbor's axis 38 and with the heads thereof spanning the opposite sides of the slots, as best shown in FIG. 2, so that as they are screw threadably tightened the end mounting surface 37 of the arbor is clampingly engaged against the mounting surface 32 of the mounting plate.

Pursuant to the present invention, an adjustable side thrust force reaction device 66 advantageously provides a reaction to resist the forces which are directed laterally outwardly or to the left when viewing FIG. 1 from the inner upright 16 and through the roller 44 and the arbor 36. Such a device includes an abutment bar or pull-in block 68 which is secured to the mounting plate 30 in rearwardly projecting relation therefrom. The bar has a bore 70 defined therethrough which opens outwardly on a longitudinally oriented vertical face 72 and on an inner reaction face 74 parallel thereto. A fastener or threaded bolt 76 extends laterally inwardly through the bore and through one or more shims 78 to be received in a threaded bore 80 defined in the arbor. Preferably, the arbor includes a laterally outwardly extending projection 82 thereon which is aligned with the abutment bar. Such projection provides a reaction face 84 which is parallel to the reaction face 74 so that the shims may be sandwiched between them.

During initial assembly of the arbor wheel mounting arrangement 10 the bolts 62 are screw threadably installed in the arbor 36 only sufficiently to obtain a light frictional contact between the engaged surfaces 32 and 37. Consequently, while the bolts are relatively tightly received in the horizontally elongated slots 34 to closely retain a predetermined elevational position of the arbor on the mounting plate, the bolts and the arbor may be still moved laterally to assure a proper mating relationship between the wheel 44 and the rail surface 20 of the inner upright 16. With the axis 38 of the arbor precisely laterally disposed in such a working position a specific lateral distance is defined between the reaction faces 74 and 84, and the appropriate number of properly sized shims 78 can be installed between the faces. Subsequently, the bolt 76 is screw threadably engaged in the arbor to pull it tightly toward the abutment bar 68. With the lateral position of the arbor positively established, the remaining bolts 62 may be torqued to a predetermined level of tightness to positively clamp the arbor against the mounting plate 30.

Figure 3:
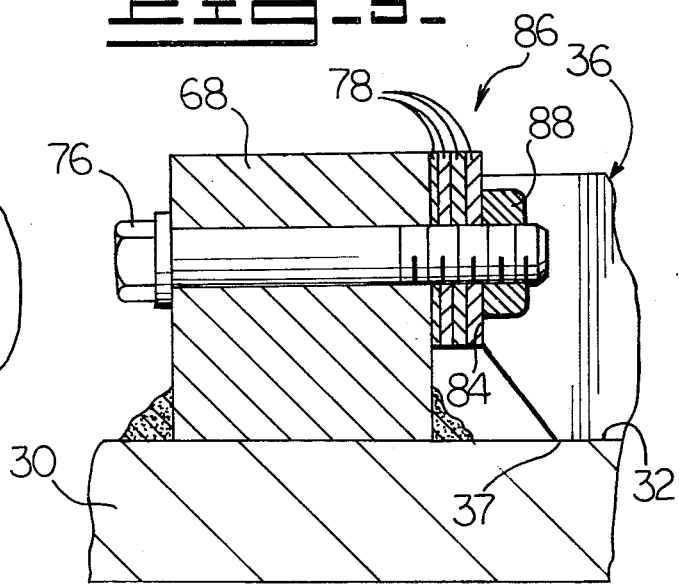
FIG. 3 is an enlarged fragmentary horizontal sectional view of an alternate embodiment adjustable arbor wheel mounting arrangement which may be compared with FIG. 1.

Referring now to FIG. 3, an alternate embodiment thrust force reaction device 86 is illustrated, with elements similar to those described with respect to the preferred embodiment being identified by identical reference numerals. Such alternate embodiment differs, however, only from the standpoint that the bolt 76 does not screw threadably extend into the arbor, but rather a pair of such bolts are individually engaged with a corresponding number of nuts 88 which serve to clamp the shims 78 against the abutment block 68. While the arbor 36 contacts the shims between the elevationally spaced apart bolts and transfers thrust forces thereto as hereinbefore described, it is not positively drawn into engagement with the shims by the bolts during the initial assembly and adjustment process. Rather, the arbor must be manually positioned against the shims before fully tightening the axially arranged bolts 62.

Thus, it is evident that the adjustable arbor wheel mounting arrangement of the present invention provides improved adjustability of the arbor, improved rigidity of construction, and improved ease of assembly. Moreover, it may be appreciated that if wear is experienced between the roller wheel 44 and the surface 20 an additional shim 78 may be installed in place as hereinbefore described.

Other aspects, objects, and advantages of this invention can be obtained from a study of the drawings, the disclosure, and the appended claims.

The embodiments of the invention in which an exclusive property or privilege is claimed are defined as follows:

1. An adjustable arbor wheel mounting arrangement, comprising:
a support frame having a mounting surface;
an arbor having an axis, an end mounting surface positioned substantially normal to the axis, and a reaction face;
wheel means mounted on the arbor for rotation about the axis;
fastening means for axially clamping the arbor end mounting surface against the mounting surface of the support frame at a preselected working position of the wheel means; and
abutment reaction means including an abutment bar having a reaction face and being mounted on the mounting surface of the support frame for directing thrust forces substantially normal to the axis from the wheel means and the reaction face of the arbor to the support frame.

2. The wheel mounting arrangement of claim 1 wherein the arbor has a threaded bore extending substantially normal to the axis and the abutment reaction means includes a threaded bolt extending through the bar and being threadably received in the bore.

3. The wheel mounting arrangement of claim 1 including shim means for transmitting loads between the reaction faces and wherein the abutment reaction means includes a fastening device connecting the shim means to the bar.

4. The wheel mounting arrangement of claim 1 including a pair of relatively movable uprights, with the support frame being connected to one of the uprights, and with the arbor and wheel means so constructed and arranged on the support frame that the wheel means rollably engages the other one of the uprights.

5. The wheel mounting arrangement of claim 4 wherein the uprights are a part of a lift truck mast unit.

* * * * *